Jan. 1, 1924
H. REITZ
TOOL
Filed Sept. 18, 1922
1,479,741
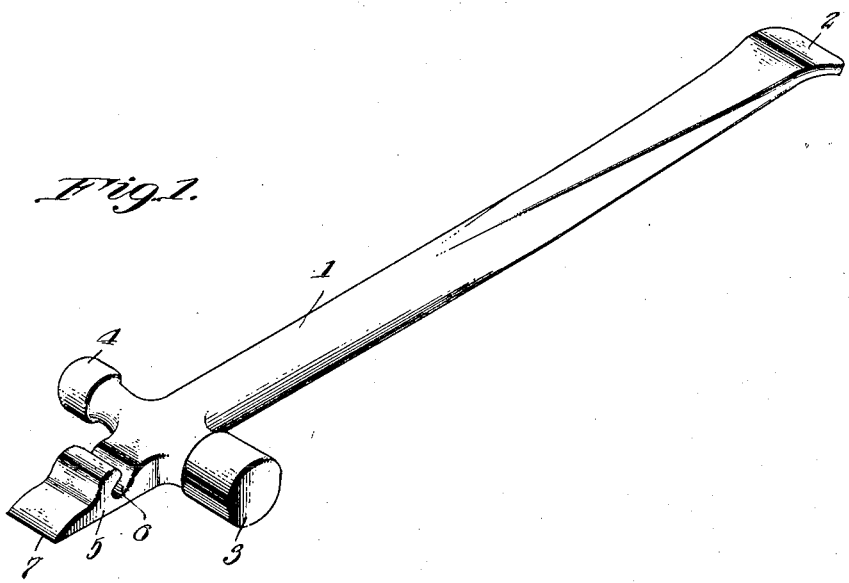
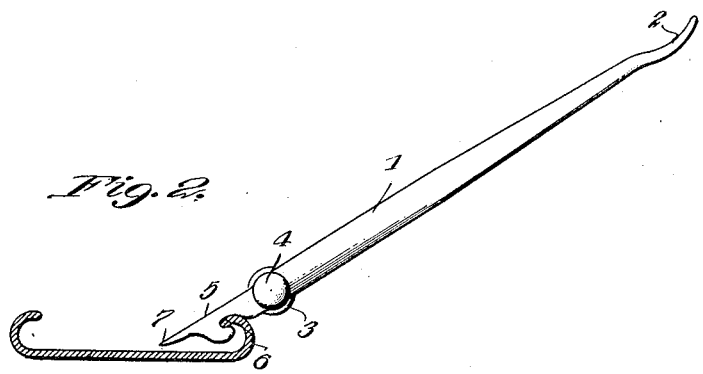

Patented Jan. 1, 1924.

1,479,741

UNITED STATES PATENT OFFICE.

HARRY REITZ, OF AMES, OKLAHOMA.

TOOL.

Application filed September 18, 1922. Serial No. 588,951.

*To all whom it may concern:*

Be it known that I, HARRY REITZ, a citizen of the United States, residing at Ames, in the county of Major and State of Oklahoma, have invented new and useful Improvements in Tools, of which the following is a specification.

This invention relates to a tire and rim tool, the general object of the invention being to provide means for straightening the edges of a rim when the same has become bent or out of true.

Another object of the invention is to provide a chisel-like part on the tool and also to provide a tire tool at one end of the device.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a perspective view of the device.

Figure 2 is a view showing how it is used.

As shown in these views the device is made in the general form of a hammer with one end of the handle 1 flattened and enlarged to form a tool 2. The hammer head shown is at 3 and the riveting head is shown at 4. An extension 5 is provided on the head and this extension is formed with a notch 6 and with a chisel 7. The notch 6 is so formed that it can be placed over the curved edge of a rim to straighten the same when the same has been bent or distorted by using the rim without a tire or the like. If there are any sharp points on the rim these can be eliminated by lightly tapping them with the hammer. As is well understood a bent rim will soon cause a tire to wear out and with this tool any one can soon take out the bent places in a rim. The chisel can be used for removing dirt and rust from the rim and the lifting head can be used for driving in loose rivets that hold the steel rim on the felloe. The chisel part also acts as a fulcrum when the device is used for straightening the flange of a rim.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A tool having an extension connected with its head, the extension having a chisel-shaped end and a curved notch formed on one face thereof, one wall of the notch being formed by a curved projection which is adapted to enter the flanged part of the rim, the chisel part adapted to act as a fulcrum when the device is in use.

In testimony whereof I affix my signature.

HARRY REITZ.